(12) United States Patent
Schnipke et al.

(10) Patent No.: US 8,728,308 B2
(45) Date of Patent: May 20, 2014

(54) BENT FILTER WITH BEND RETENTION FEATURE

(75) Inventors: Travis Schnipke, Findlay, OH (US); Gary L. Rickle, Wharton, OH (US)

(73) Assignee: Kuss Filtration Inc., Findlay, OH (US)

( * ) Notice: Subject to any disclaimer, the term of this patent is extended or adjusted under 35 U.S.C. 154(b) by 262 days.

(21) Appl. No.: 13/347,198

(22) Filed: Jan. 10, 2012

(65) Prior Publication Data

US 2012/0175297 A1    Jul. 12, 2012

Related U.S. Application Data

(60) Provisional application No. 61/431,630, filed on Jan. 11, 2011.

(51) Int. Cl.
| | | |
|---|---|---|
| *B01D 35/28* | (2006.01) | |
| *B01D 29/15* | (2006.01) | |
| *B01D 29/17* | (2006.01) | |
| *B01D 29/21* | (2006.01) | |
| *F02M 37/22* | (2006.01) | |

(52) U.S. Cl.
USPC ............... 210/172.2; 210/172.1; 210/172.3; 210/172.4; 210/232; 210/416.4; 210/459; 210/460; 210/461; 210/486

(58) Field of Classification Search
CPC .... B01D 29/0029; B01D 29/11; B01D 29/17; B01D 29/21; B01D 29/333; F02M 37/22
USPC ......... 210/172.1–172.4, 416.4, 456, 460, 461
See application file for complete search history.

(56) References Cited

U.S. PATENT DOCUMENTS

| | | | | |
|---|---|---|---|---|
| 5,055,187 | A * | 10/1991 | Ito et al. ..................... | 210/172.4 |
| 6,471,072 | B1 * | 10/2002 | Rickle et al. ................ | 210/486 |
| 2005/0236321 | A1 * | 10/2005 | Usui et al. .................. | 210/416.4 |

* cited by examiner

*Primary Examiner* — Benjamin Kurtz
(74) *Attorney, Agent, or Firm* — Brinks Gilson & Lione

(57) ABSTRACT

A filter has an elongated filter envelope with an inner pocket containing filter material and configured to receive fluid filtered by the filter envelope. The filter envelope has a bent position defined by a port portion and a loop portion, the loop portion and the port portion overlapping each other at least partially. A port is attached to the filter envelope proximate the port end and is configured to be connected to a hydraulic device and to allow fluid to be released from the pocket. The filter envelope has a periphery with a sealed rim and a slit splitting a portion of the rim so as to form a flexible retention element unitarily attached to the loop portion of the filter envelope. The retention element is positioned around one of the port and the port portion of the filter envelope to retain the filter envelope in the bent position.

20 Claims, 4 Drawing Sheets

BENT FILTER WITH BEND RETENTION FEATURE

CROSS REFERENCE TO RELATED APPLICATION

This application claims the benefit of U.S. provisional application entitled FOLDED FILTER WITH FOLD RETENTION FEATURE, application No. 61/431,630 filed on Jan. 11, 2011, the entirety of which is hereby incorporated by reference.

TECHNICAL FIELD OF THE INVENTION

The present invention generally relates to a filter. Particularly, the disclosure herein relates to a retention feature for holding the filter in a bent position.

BACKGROUND OF THE INVENTION

In-tank filters provided for filtering fuel supplied to the inlet of a fuel pump face tight spatial restrictions and must thus be small in size, yet provide a large filter surface for ensuring a continuous functionality without clogging. These demands have resulted in filters that are bent to be arranged along the pump surface, or to form filter layers arranged parallel to each other. Filters arranged along the surface of the pump must be retained on the pump, which requires additional labor steps. In contrast, filters folded onto themselves to form layers at an acute angle or parallel to each other can be easily preassembled into their folded shape, provided that the filter possesses a retention feature that prevents unfolding of the filter prior to installation. Such retention features typically require that additional components are affixed to the filter, increasing the cost of the filter and possibly reducing the filtration area and capability of the filter. The additional components include a plastic zip tie or other plastic wrap that would encircle the folded portions of the filter to hold the folded position.

SUMMARY OF THE INVENTION

It has been found that filters folded onto themselves to form layers at an acute angle or parallel to each other can be easily preassembled into their folded shape, provided that the filter possesses a retention feature that prevents unfolding of the filter prior to installation.

According to a first aspect of the invention, a filter has an elongated filter envelope with a port end and a loop end opposite the port end. The filter envelope has an inner pocket containing filter material and configured to receive fluid filtered by the filter envelope. The filter envelope has a bent position defined by a port portion of the filter envelope including the port end and a loop portion of the filter envelope including the loop end, the loop portion and the port portion overlapping each other at least partially. A port is attached to the filter envelope proximate the port end and is configured to be connected to a hydraulic device and to allow fluid to be released from the pocket. The filter envelope has a periphery with a sealed rim and a slit splitting a portion of the rim so as to form a flexible retention element unitarily attached to the loop portion of the filter envelope. The retention element is positioned around one of the port and the port portion of the filter envelope to retain the filter envelope in the bent position.

In another aspect of the present invention, the slit extends along the loop end of the filter envelope, thereby forming a loop, the loop being dimensioned to retain the filter envelope in the bent position.

The slit may have a length that allows a variation of the distance between the port end and the loop end when the loop is positioned around the port or the port portion of the filter body.

In a further aspect of the invention, the port has a first portion with a flow direction extending along a common plane with the filter envelope and a second portion intersecting the common plane and in communication with the first portion via an elbow. The elbow may have a 90° bend or another angle suitable for a desired application.

The first portion may have a wider diameter parallel to the common plane than perpendicular thereto. Such dimensioning of the first portion keeps the filter thin.

The filter envelope may formed of nonwoven textile material or woven material or a combination of both.

In a further aspect of the present invention, the filter envelope is made of a strip of porous, flexible material with a central fold, with a top layer and a bottom layer unitarily connected at one end of the envelope and sealed together along the remaining periphery, thereby forming the rim.

In such a folded construction the port end can be located at the end where the top layer and the bottom layer are unitarily connected where no rim can possibly interfere with the attachment of the port.

For secure attachment, the port may have a flange attached to the port end of the filter envelope.

The rim may be wider along the periphery where the rim is split by the slit than in areas in which the rim is not split. This leaves a sufficient width of the rim between the pocket and the slit to seat the top and bottom layers together.

The loop end may have a rectangular contour, a rounded contour, such as a semicircular contour, or any other shape suitable for an intended application.

Further details and advantages become apparent from the following description of several exemplary embodiments. The drawings are provided solely for illustrative purposes and are not intended to limit the scope of the present invention.

DETAILED DESCRIPTION OF THE DRAWINGS

Figure 1:
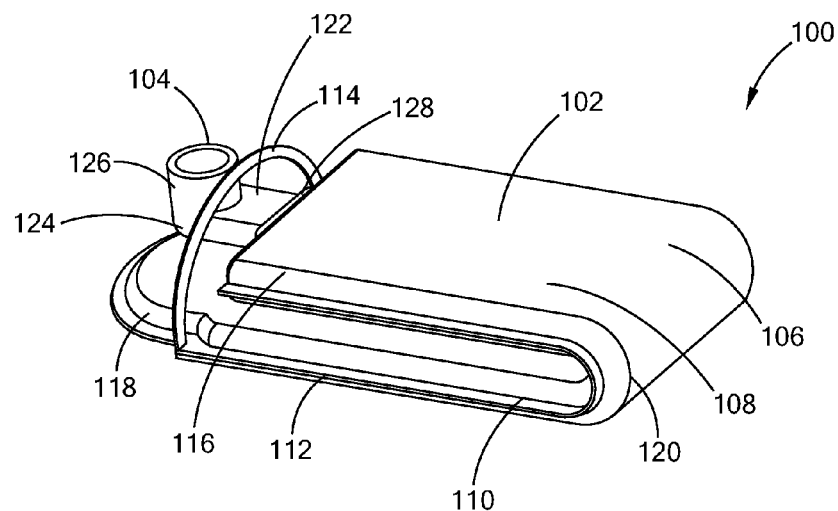
FIG. 1 shows a view of a first exemplary embodiment of a filter with an integrated retention feature where the filter is retained in the bent position.
Figure 2:
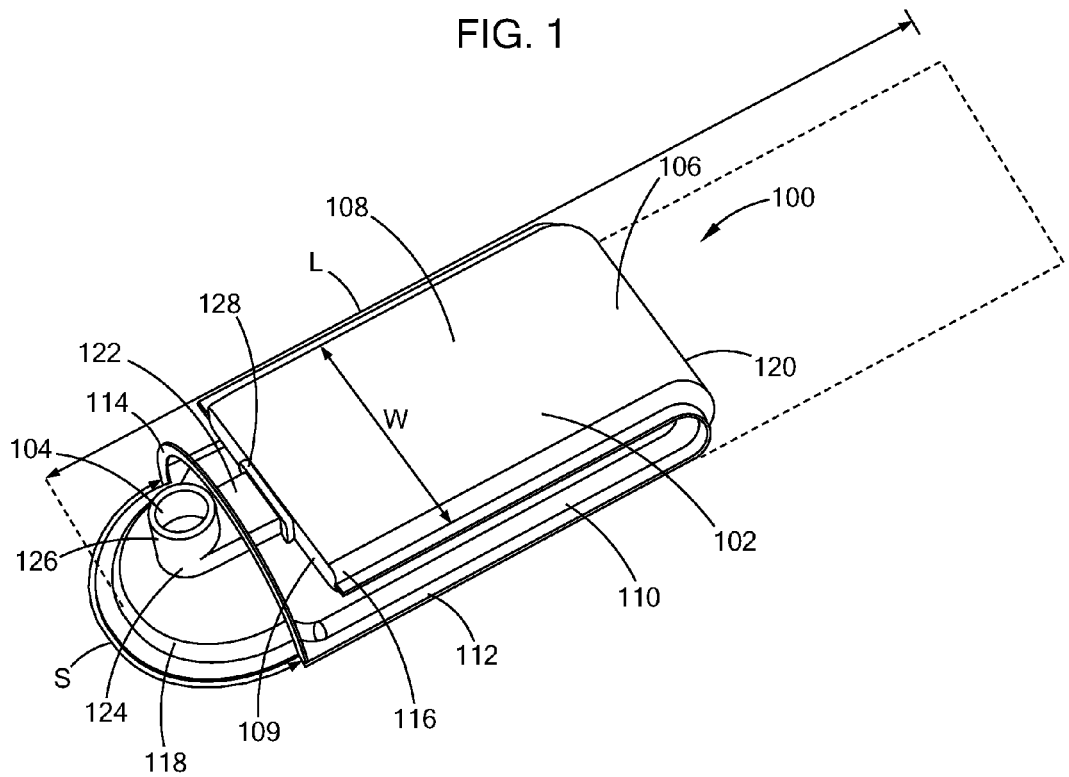
FIG. 2 shows another view of the filter with retention feature of FIG. 1, where the filter is retained in the bent position.
Figure 3:
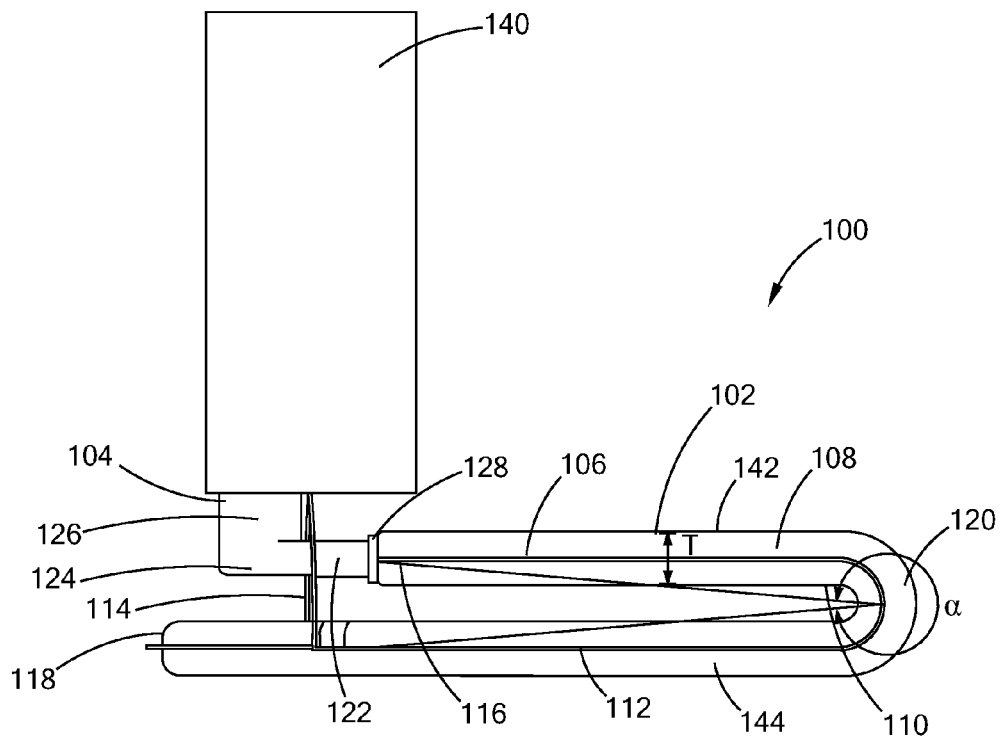
FIG. 3 shows the filter of FIG. 1 connected to a pump inlet.

FIGS. 1 through 3 show a first exemplary embodiment of a filter 100 that will be described in the following in a synopsis of FIGS. 1 through 3. The filter 100 has a filter body 102 and a port 104 for connecting the filter 100 to a pump 140 or another hydraulic device. The filter body 102 has a filter envelope 106 that has an elongated, flat pillow shape and accommodates suitable filter material (not shown) in an interior pocket. The longest dimension of the filter body 102 in an unbent, straight state will be referred to as the length L (indicated in FIG. 2), the smallest dimension of the filter body 102 as the thickness T (indicated in FIG. 3), and the intermediate dimension will be called the width W (indicated in FIG. 2). In the unbent state, the filter body 102 typically measures within a range of 5 to 50 cm in length L by 1.5 to 30 cm in width W by 0.2 to 5 cm in thickness T. Depending on an individual application, actual dimensions may lie outside these ranges. The filter envelope 106 is preferably assembled from a long strip of textile material folded in half, thereby forming a top layer 108 and a bottom layer 110 that are unitarily connected along a fold 109 at one end of the length of the filter envelope 106. Along the remaining periphery of the filter envelope 106, the top layer 108 and the bottom layer 110 are sealed together, thereby forming a flat rim 112 extending around the other three sides of the filter body 102. The textile material of the filter envelope is porous and may be woven or nonwoven, or a combination of both.

The port 104 is attached to the filter envelope 106 with a flange 128 in the area of the fold 109 and protrudes from the filter body 102 in a direction coinciding with the direction of the length of the filter body 102. The portion of the filter body 102 adjacent the port 104 will be referred to in the following as the port end 116. In the present embodiment, the port end 116 coincides with the area of the fold 109. While the filter envelope 106 of filter 100 is manufactured from one textile strip, it may also be made of two textile strips sealed together around their entire periphery so that the port end 116 may not have a fold area.

The portion of the filter body 102 opposite the port end 116 will be referred to herein as the loop end 118. At the loop end 118, the rim 112 is widened along a portion of the envelope periphery. A retention loop 114 is formed by a slit along the periphery of the envelope 106 that splits the rim 112 along the slit in the area of the rim 112 that is widened. The section of the rim 112 located outward from the slit forms the retention loop 114. Because the retention loop 114 is formed in one piece with the textile material of the filter envelope 106, no additional components are required to manufacture the retention loop 114 and no additional labor is required for attaching the retention loop 114 to the filter body 102. In the shown embodiment, the loop end 118 has a rounded, semicircular contour, rendering the loop in the shape of a half circle. Notably, the contour may be of any shape conducive to forming the retention loop 114, for instance rectangular or trapezoid. Accordingly, the loop 114 may be U-shaped, V-shaped or even straight, where the slit is only a straight cut. Also, where appropriate, the loop 114 may not be arranged in a central position at the loop end 118, for instance where the port 104 is offset to one of the lateral sides of the filter body 102. Due to the flexibility of the material of the retention loop 114, the shape of the retention loop 114 is secondary to the length S of the slit (indicated in FIG. 2). The length S, along with the width W of the filter body 102, determines how far the port end 116 can move away from the loop end 118 when the retention loop 114 is placed around the port 104. Notably, while the embodiment shown depict the loop 114 as being placed around the port 104, the retention loop 114 may also be configured to be placed around a portion of the filter body 102 as explained in more detail below.

When the retention loop 114 is positioned over the port 104 or over the filter body 102 near the port end 116, the filter body 102 exhibits a bend 120 between the port end 116 and the loop end 118. The bend 120 divides the filter body 102 into a port portion 142 on one side of the bend 120 that contains the port end 116 and a loop portion 144 on the other side of the bend 120 that contains the loop end 118. Depending on spatial limitations of the location where the filter 100 is mounted, the bend 120 can at most have an outside angle $\alpha$ of 360° and at least an outside angle $\alpha$ determined by the maximum distance between the port end 116 and the loop end 118 when the retention loop 114 is completely stretched. This distance is smaller than S/2. With this configuration, the filter 100 obtains a floating design that allows the loop end 118 to stay close to the bottom of an expanding and contracting tank. In the variation, in which the retention loop 114 is configured to be placed around the port portion 142 of the filter body 102, the position of the port 104 on the filter envelope 106 can be varied to a greater extent because the port 104 does not need to accommodate the retention loop 114.

The length S of the slit is preferably calculated to form a retention loop 114 that allows an outside angle $\alpha$ in a range of 300° to 360°. Accordingly, the length S depends on the maximum desired outside angle $\alpha$ and on the thickness of the filter body 102. If the retention loop 114 is positioned around the port 104, the size of the port 104 has an influence on the length S as well. The retention loop 114 is dimensioned for leaving enough space between the portions of the bottom layer 110 in the loop portion 144 and in the port portion 142 to take in the surrounding fluid. Expediently, the bend 120 describes a radiused curve as shown in the embodiment of FIGS. 1 through 3 to expose the entire surface area of the bottom layer 110. This can, for example, be accomplished with stiffening material embedded in the rim. But even without added material, the bottom layer 110 is preferably exposed to the outside fluid over most of its area to maximize the filter effect. This can be achieved with a suitable length of the retention loop 114 that allows the indicated outside angle $\alpha$ while still holding the filter body 102 in a compact bent state.

The port 104 may, for example, be made of molded plastic. To ease positioning the retention loop 114 on the port 104 and in order to reduce the space required for installation of the filter 100 on the pump or on another hydraulic device, the port 104 has a flat portion 122 adjacent to the flange 128. The flat portion 122 extends in the same plane as the port portion 142 of the filter body 102 defined by the length L and the width W in the unbent state of the filter body 102. For fluid exiting the filter body 102, the flat portion 122 defines an interior flow direction coinciding with the direction of the filter envelope length L of the portion of the filter body 102 attached to the port 104. The flat portion 122 is wider in the direction of the filter envelope width W than in the direction of the filter envelope thickness T and thus enables an installation in tanks with limited space between the pump 140 and a tank bottom, as illustrated in FIG. 3.

The flat portion 122 opens into an elbow 124 that establishes a communication with a cylindrical portion 126 adapted to be connected to a complementary port on the pump 140. The cylindrical portion 126 has a flow direction intersecting with the plane of the filter body 102 that is defined by the length and the width of the filter body in an unbent state. While the elbow 124 is depicted as having an angle of 90°, any other angle is also within the scope of the present invention. The elbow angle can be adapted to an intended application. The elbow 124 between the flat portion 122 and the cylindrical portion 126 forms a hook-like structure that prevents the retention loop 114 from slipping off the port 104 before installation so that the filter 100 will retain its preassembled constellation until installation. The port 104 may be manufactured in one piece including the cylindrical portion 126, the elbow 124, the flat portion 122, and the flange 128. Likewise, the port 104 may be assembled from several pieces.

As evident from FIG. 3, when the filter 100 is attached to the pump 140, the retention loop 114 is prevented from being disconnected from the port 104 of the filter 100. FIG. 3 also shows the limited relative movement between the loop end 118 and the port end 116. While the filter body 102 is flexible enough to allow contact between the port 104 and the loop end 118, it has a natural tendency to straighten out. This tendency effects that the loop end will, within the limits set by the length of the retention loop 114, move away from the port 104 when the spatial conditions allow it to do so. Accordingly, the loop position has a floating function allowing it to stay close to the bottom of a tank that may expand and contract. Analogous considerations apply where the retention loop is held by the port portion 142 of the filter body 102 instead of the port 104 itself.

Figure 4:
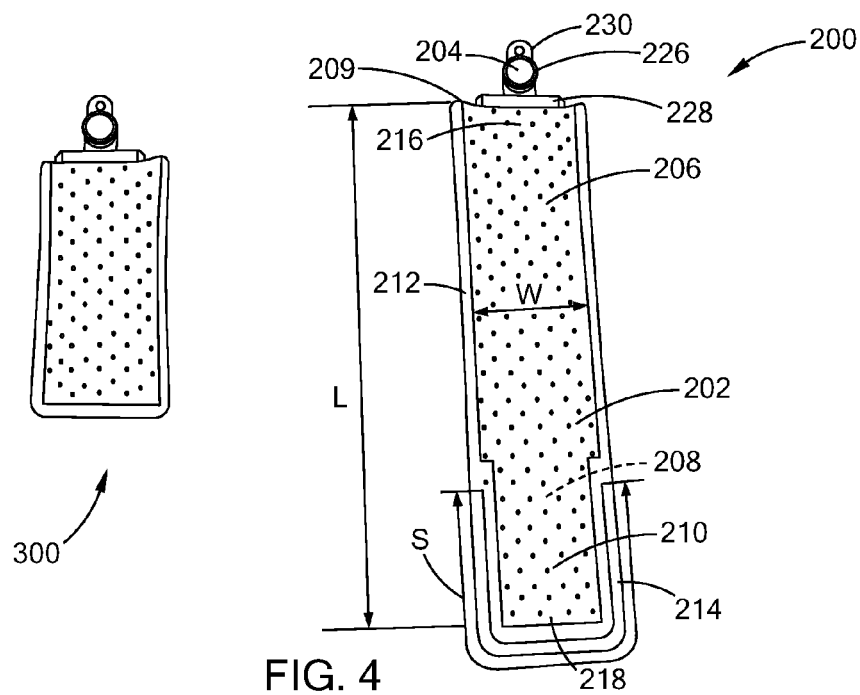
FIG. 4 shows a second exemplary embodiment of a bent filter with a retention feature in a comparative view with a conventional filter designed for installation without bending.
Figure 5:
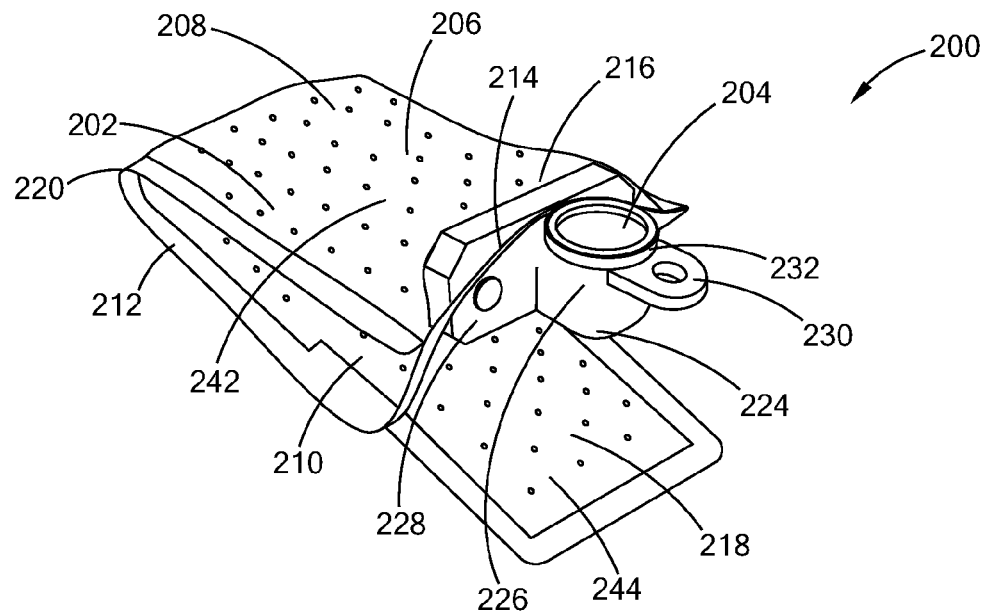
FIG. 5 shows a side view of the filter of FIG. 4 in the bent configuration and retained by a retention element.
Figure 6:
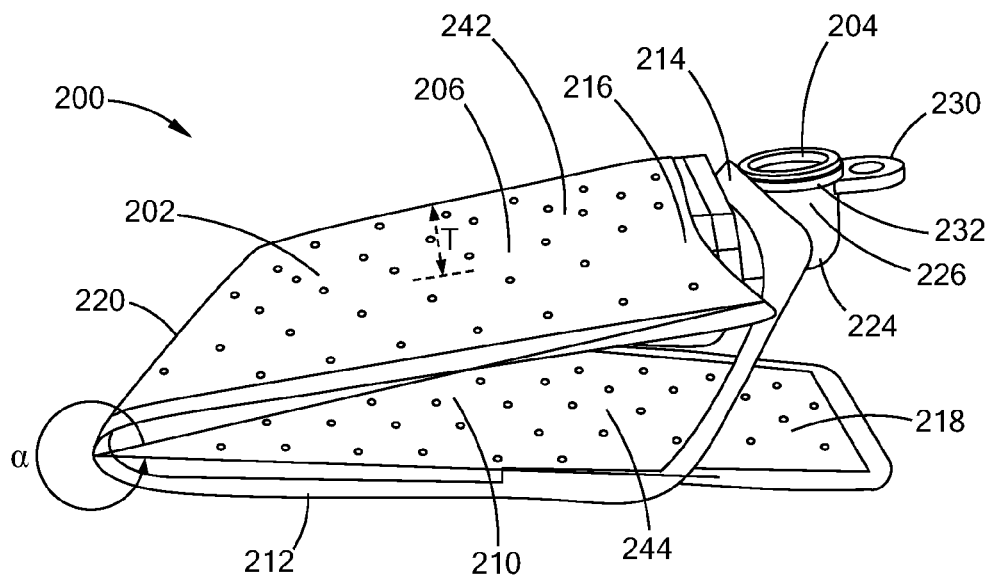
FIG. 6 shows a perspective view of the filter of FIG. 4 in the bent configuration with the retention element around the port of the filter.

FIGS. 4 through 6 show a second exemplary embodiment of a filter 200 in accordance with the principles of the present invention. Parts with equivalent functions to those shown in FIGS. 1 through 3 bear reference numerals raised by 100 compared to those of FIGS. 1 through 3.

FIG. 4 shows the filter 200 in comparison with a filter 300 that does not provide a bend in the filter body. It is evident from FIG. 4 that the filter 200 has a filter area defined by its length L and width W that is approximately twice the filter area of the filter 300 without the bend.

In the following, the filter 200 will be described in more detail in a synopsis of FIGS. 4 through 6. The filter 200 has a filter body 202 and a port 204 for connecting the filter 200 to a pump or another hydraulic device (not shown). The filter body 202 has a filter envelope 206 that has an elongated, flat pillow shape and accommodates suitable filter material (not shown) in an interior pocket. The longest dimension of the filter body 202 will be referred to as the length L (indicated in FIG. 4), the smallest dimension of the filter body 202 as the thickness T (indicated in FIG. 6), and the intermediate dimension will be called the width W (indicated in FIG. 4). In the unbent state, the filter body 202 has similar dimensions as the filter body of the embodiment depicted in FIGS. 1 through 3. The filter envelope 206 is preferably assembled from a long strip of textile material folded in half, thereby forming a top layer 208 and a bottom layer 210 that are unitarily connected along a fold 209 at one end of the length of the filter envelope 206. Along the remaining periphery of the filter envelope 206, the top layer 208 and the bottom layer 210 are sealed together, thereby forming a flat rim 212. The textile material of the filter envelope is porous and may be woven or nonwoven or a combination off woven and nonwoven materials.

The port 204 is attached to the filter envelope 206 with a flange 228 in the area of the fold 209 and protrudes from the filter body 202 in a direction coinciding with the direction of the length of the filter body 202. The fold area will be referred to in the following as the port end 216. While the filter envelope 206 of filter 200 is manufactured from one textile strip, it may also be made of two textile strips sealed together around their entire periphery.

The portion of the filter body 202 opposite the port end 116 will be referred to herein as the loop end 218. At the loop end, the rim 212 is widened along a portion of the envelope periphery. A retention loop 214 is formed by a slit along the periphery of the envelope 206 that splits the rim 212 along the slit in the area where the rim 212 is widened. The section of the rim 212 located outward from the slit forms the retention loop 214. Because the retention loop 214 is formed in one piece with the textile material of the filter envelope 206, no additional components are required to manufacture the retention loop 214 and no additional labor is required for attaching the retention loop 214 to the filter body 202. The location of the retention loop 214 on the filter body 202 is in the following referred to as the loop end 218. As an alternative example, the loop end 218 of filter 200 has an approximately rectangular contour. As previously explained, the shape of the loop end 218 is only secondary to the function of the retention loop 214 and can be chosen for optimum performance and to adapt the filter 200 to spatial limitations. The length S of the retention loop 214, along with the width W of the filter body 102, determines the maximum distance D between the port end 216 and the loop end 218 when the retention loop 214 is placed around the port 204.

When the retention loop 214 is positioned over the port 204 and retained by the port 204, the filter body 202 exhibits a bend 220 between the port end 216 and the loop end 218. Depending on spatial limitations of the location where the filter 100 is mounted, the bend 220 can at most have an outside angle $\alpha$ of 360° and at least an outside angle determined by the maximum distance between the port end 216 and the loop end 218 when the retention loop 214 is completely stretched. This distance is smaller than S/2. The length S of the slit is preferably calculated to form a retention loop 214 that allows an outside angle $\alpha$ in a range of 300° to 360°. Accordingly, the length S depends on the maximum desired outside angle $\alpha$ and on the thickness of the filter body 202. If the retention loop 214 is positioned around the port 104, the size of the port 104 has an influence on the length S as well. The retention loop 214 is dimensioned for leaving enough space between the portions of the bottom layer 210 in the loop portion 244 and in the port portion 242 to take in the surrounding fluid. The bottom layer 210 is preferably exposed to the outside fluid over most of its area to maximize the filter effect. This can be achieved with a suitable length of the loop 214 that allows the indicated outside angle $\alpha$ while still holding the filter body 202 in a compact bent state.

The port 204 may, for example, be made of molded plastic. The port 204 of filter 200 is slightly shortened in comparison with filter 200. Port 204 has an elbow 224 adjacent to the flange 228 so that it does not exhibit an extended flattened portion. In the area of the flange 228, the elbow 224 has a cross-section that is wider in the direction of the filter envelope width W than in the direction of the filter envelope thickness T so that it lies substantially coplanar with the filter body in the unbent state. The elbow defines a flow direction adjacent to the area of the flange that extends in the direction of the length of the filter body 202 in the unbent state.

The elbow 224 establishes a communication with a cylindrical portion 226 adapted to be connected to a complementary port on the pump. The cylindrical portion 226 has a flow direction intersecting with the plane of the filter body 202 that is defined by the length L and the width W of the filter body. The cylindrical portion port 204 carries an O-ring 232 sealing any gap between the port 204 and a corresponding port of the connected hydraulic device. Furthermore, an eyelet 230 formed as a tab on the cylindrical portion 226 may ease handling during installation and provides the option of securing the port 204 to the hydraulic device through the eyelet 230.

While the elbow 224 is depicted as having an angle of 90°, any other angle is also within the scope of the present invention. The elbow angle can be adapted to an intended application. The elbow 224 forms a hook-like structure that prevents the retention loop 214 from slipping off the port 204 before installation so that the filter 200 will retain its preassembled constellation until installation. The port 204 may be manufactured in one piece including the cylindrical portion 226, the elbow 224, and the flange 228. Likewise, the port 204 may be assembled from several pieces.

Both depicted embodiments provide that the retention loop allows a bend angle on the filter to be controlled by loop design specification, and can thereby provide some flexibility for the filter to expand and contract, such as for example in a fuel tank or filter module during operation. The filter may also act as a spring that can maintain contact with a bottom of a fuel tank. Where little play is desired, the slit may only extend along a short distance along the rim at the loop end of the filter body. The slit may be straight or bend, angled or rounded.

It will be appreciated that the retention loop in any of FIGS. 1-6 is made from the filter envelope 106 or 206, respectively, and that the retention loop may or may not be limited to the specific configuration of a loop, as long as it is a retention element made from the filter envelope, it may be constructed as any suitable retaining structure to hold the filter in the bent position.

Figure 7:
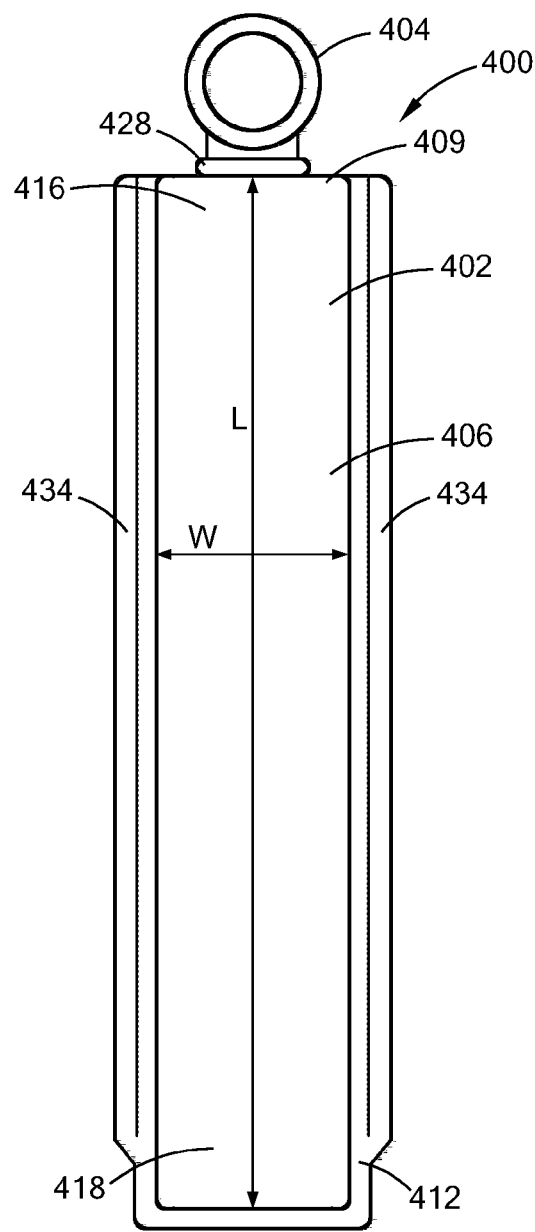
FIG. 7 shows a third exemplary embodiment of a filter in an unbent state.
Figure 8:
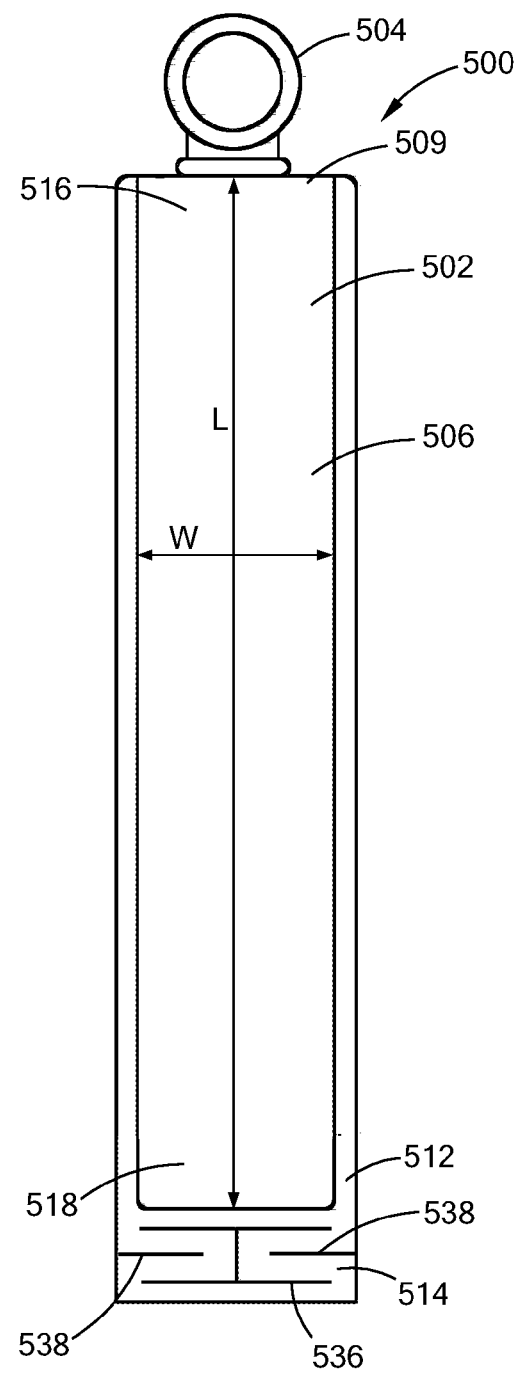
FIG. 8 shows a fourth exemplary embodiment of a filter in an unbent state

For example, as illustrated in FIGS. 7 and 8, the loop may be formed by a variety of cuts in the rim of the filter envelope. Functionally equivalent parts bear reference numerals raised by multiples of 100 relative to the embodiments shown in FIGS. 1 through 6.

FIG. 7 shows an exemplary filter 400 with a filter body 402 and a port 404. The filter body is formed by a filter envelope 406 that encloses a pocket containing filter material. The filter envelope 406 has an approximately rectangular shape with a width W and a length L, the length L being greater than the width W. The filter envelope 406 has a flat rim 412 on three of its four sides. The port 404 is attached to a port end 416 of the filter envelope 406 on one of the shorter sides. In the shown embodiment, a fold 409 is located at the port end 416.

The rim 412 has a pair of strips 434 cut from the rim 412 by a pair of slits along the length L of the filter body. The strips 434 are unitarily connected to the rim 412 near the loop end 418. To form a retention loop with an adjustable length, the loose ends of the strips 434 can be tied together at a desired length before or after installation of the filter 400. It is evident from this illustrative example that fairly long retention loops can be created by the rim material. While an extension of the slits in the embodiments of FIGS. 1 through 6 would move the attachment of the retention loops 114 and 214 away from the loop end toward the port end, the strips 434 of the present embodiment remain attached to the loop end 418 opposite the port end 416 regardless of the length of the resulting retention loop.

Furthermore, FIG. 8 illustrates that a retention loop 514 can be created at the loop end 518 without moving the attachment of the retention loop 514 toward the port end. FIG. 8 shows an exemplary filter 500 with a filter body 502 and a port 504. The filter body 506 is formed by a filter envelope 506 that encloses a pocket containing filter material. The filter envelope 506 has an approximately rectangular shape with a width W and a length L, the length L being greater than the width W. The filter envelope 506 has a flat rim 512 on three of its four sides. The port 504 is attached to a port end 516 of the filter envelope 506 on one of the shorter sides. In the shown embodiment, a fold 509 is located at the port end 516. The filter envelope has a widened rim at the loop end 518 opposite the port end 516.

Instead of a U-shaped slit, the illustrative embodiment of FIG. 8 has a slit 536 shaped like a letter H lying on its side. The slit 536 is supplemented by a pair of incisions 538 leading between the legs of the H. The slit 536 and the incisions 538 thus create a meander-like shape forming a retention loop 514. The length of the retention loop 514 can be varied during production by adjusting the length of the slit 536 and of the incisions 538. The location where the retention loop 514 is attached to the filter body 502 does not change with the length of the loop 514. Also, the retention loop 514 can be cut into two strips that allow attachment to the port 504 or to the filter body 502 after installation if so desired.

Regardless of the shape of the retention element, be it a loop or strips, the retention element allows the bend angle α of the filter to be controlled by appropriate dimensions and can provide flexibility for the filter to expand and contract with a fuel tank or module during operation.

Such a filter as shown and described herein is useful in, for example, in-tank suction fuel filters that sometimes employ "sock" style filter envelope configurations, and can be used with various pump modules, such as fuel pumps.

The invention may be embodied in other forms without departing from the spirit or novel characteristics thereof. The embodiments disclosed in this application are to be considered in all respects as illustrative and not limiting. Various details shown in one of the illustrative embodiments may be combined with details of other illustrative embodiments. The scope of the invention is indicated by the appended claims rather than by the foregoing description; and all changes which come within the meaning and range of equivalency of the claims are intended to be embraced therein.

What is claimed is:

1. A filter comprising:
an elongated filter envelope having a port end and a loop end opposite the port end, the filter envelope enclosing an inner pocket, the inner pocket being configured to receive fluid filtered by the filter envelope, the filter envelope having a bent position defined by a port portion of the filter envelope including the port end and a loop portion of the filter envelope including the loop end, the loop portion and the port portion at least partially overlapping each other;
filter material disposed in the pocket; and
a port attached to the filter envelope proximate the port end, the port being configured to be connected to a hydraulic device and to allow fluid to be released from the pocket;
the filter envelope having a periphery with a sealed rim and a slit splitting a portion of the rim so as to form a flexible retention element unitarily attached to the loop portion of the filter envelope, the retention element being positioned around one of the port and the port portion of the filter envelope to retain the filter envelope in the bent position.

2. The filter according to claim 1, wherein the slit extends along the loop end of the filter envelope, thereby forming the retention element as a loop, the loop being dimensioned to retain the filter envelope in the bent position.

3. The filter according to claim 2, wherein the slit has a length that allows a variation of a distance between the port end and the loop end when the loop is positioned around the one of the port and the port portion.

4. The filter according to claim 1, wherein the port has a first portion with a flow direction extending along a common plane with the filter envelope and a second portion in communication with the first portion via an elbow, the second portion having a flow direction intersecting the common plane, the first portion arranged between the port end of the filter envelope and the second portion.

5. The filter according to claim 4, wherein the elbow has a 90° bend.

6. The filter according to claim 4, wherein the first portion has a wider outer diameter in two directions parallel to the common plane than perpendicular to the common plane.

7. The filter according to claim 1, wherein the envelope is formed of nonwoven textile material.

8. The filter according to claim 1, wherein the filter envelope is made of a strip of porous, flexible material with a central fold, thereby forming a top layer and a bottom layer unitarily connected at one end of the envelope, the top layer and the bottom layer being sealed together along the periphery, thereby forming the rim.

9. The filter according to claim 8, wherein the port end is located at the end where the top layer and the bottom layer are unitarily connected.

10. The filter according to claim 6, wherein the port has a flange attached to the port end of the filter envelope and wherein the first portion extends from the flange to the elbow.

11. The filter according to claim 1, wherein the rim is wider along the periphery in the portion where the rim is split by the slit than in portions in which the rim is not split.

12. The filter according to claim 1, wherein the loop end has a rounded contour.

13. The filter according to claim 12, wherein the contour is semicircular.

14. The filter according to claim 1, wherein the loop end has a rectangular contour.

15. The filter according to claim 1, wherein the loop portion of the filter envelope is longer than the port portion of the envelope so that the loop end extends beyond the port end of the filter envelope.

16. The filter according to claim 15, wherein the slit is entirely formed in an end portion of the loop portion that is outside any overlap with the port portion of the filter element.

17. The filter according to claim 6, wherein the port has a flange attached to the port end of the filter envelope, the flange arranged between the first portion and the filter envelope.

18. The filter according to claim 4, wherein the port portion of the filter envelope has a thickness and the second portion of the port protrudes beyond the thickness of the port portion of the filter envelope.

19. The filter according to claim 18, wherein, in the bent position, the loop portion extends on a side of the filter envelope opposite the side, to which the second portion of the port extends, and wherein the loop is attached to the port.

20. The filter according to claim 1, wherein the slit has a length such that an outer angle formed by the loop and port portions of the filter envelope is in the range of about 300 to 360 degrees.

* * * * *